(12) United States Patent
Twede et al.

(10) Patent No.: US 9,691,208 B2
(45) Date of Patent: Jun. 27, 2017

(54) MECHANISMS FOR AUTHENTICATING THE VALIDITY OF AN ITEM

(71) Applicant: Lockheed Martin Corporation, Bethesda, MD (US)

(72) Inventors: David R. Twede, Orlando, FL (US); Scott L. Roberson, Ocoee, FL (US); Edward J. Miesak, Windermere, FL (US); Richard A. Vaughn, Arlington, TX (US); Christian Adams, Yalaha, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 553 days.

(21) Appl. No.: 14/014,893

(22) Filed: Aug. 30, 2013

(65) Prior Publication Data
US 2014/0062652 A1  Mar. 6, 2014

Related U.S. Application Data

(63) Continuation-in-part of application No. 12/714,055, filed on Feb. 26, 2010, now Pat. No. 8,678,290.

(60) Provisional application No. 61/695,920, filed on Aug. 31, 2012.

(51) Int. Cl.
*G07C 11/00* (2006.01)
*H04W 12/06* (2009.01)

(52) U.S. Cl.
CPC ............. *G07C 11/00* (2013.01); *H04W 12/06* (2013.01)

(58) Field of Classification Search
CPC ................................ G07C 11/00; H04W 12/06

USPC .................................................. 235/454, 491
See application file for complete search history.

(56) References Cited

U.S. PATENT DOCUMENTS

| | | | |
|---|---|---|---|
| 4,982,073 A | 1/1991 | Stenzel | |
| 7,537,170 B2 | 5/2009 | Reed et al. | |
| 7,926,730 B2 | 4/2011 | Auslander et al. | |
| 2002/0090112 A1 | 7/2002 | Reed et al. | |
| 2003/0141375 A1 | 7/2003 | Lawandy | |
| 2004/0022294 A1 | 2/2004 | Yamamori et al. | |
| 2004/0038390 A1 | 2/2004 | Boege et al. | |
| 2004/0144845 A1* | 7/2004 | Bidault | G01N 21/552 235/454 |

(Continued)

FOREIGN PATENT DOCUMENTS

| | | |
|---|---|---|
| EP | 2590032 A1 | 5/2013 |
| WO | 2008008771 A2 | 1/2008 |
| WO | 2011005222 A1 | 1/2011 |

OTHER PUBLICATIONS

Non-final Office Action for U.S. Appl. No. 12/714,055 mailed Aug. 30, 2012, 8 pages.

(Continued)

*Primary Examiner* — Toan Ly
(74) *Attorney, Agent, or Firm* — Withrow & Terranova, PLLC

(57) ABSTRACT

Mechanisms for validating the authenticity of an item. A reader device records authentication data that is obscured in a label. The authentication data is provided to a remote authentication server via a network. The reader device receives, from the remote authentication server, an authentication response based on the authentication data. Based at least in part on the authentication response, the reader device displays an indication that identifies whether the item is authentic.

9 Claims, 8 Drawing Sheets

(56) References Cited

U.S. PATENT DOCUMENTS

| | | | |
|---|---|---|---|
| 2004/0150217 A1 | 8/2004 | Heffelfinger et al. | |
| 2005/0121619 A1 | 6/2005 | Aleu | |
| 2005/0236481 A1 | 10/2005 | Gascoyne et al. | |
| 2005/0243305 A1 | 11/2005 | Vig et al. | |
| 2005/0269416 A1* | 12/2005 | Sussmeier | G06K 7/12 235/494 |
| 2006/0041898 A1 | 2/2006 | Potyrailo et al. | |
| 2006/0157559 A1* | 7/2006 | Levy | G06K 17/00 235/380 |
| 2007/0022294 A1 | 1/2007 | Lapstun et al. | |
| 2007/0138285 A1 | 6/2007 | Auslander et al. | |
| 2007/0246543 A1 | 10/2007 | Jones et al. | |
| 2008/0011841 A1* | 1/2008 | Self | G06Q 30/06 235/385 |
| 2009/0194589 A1 | 8/2009 | Moon et al. | |
| 2009/0302113 A1* | 12/2009 | Li | G07F 7/02 235/454 |
| 2010/0140501 A1 | 6/2010 | Lawandy | |
| 2011/0114733 A1* | 5/2011 | Heim | B42D 25/29 235/491 |
| 2011/0180603 A1 | 7/2011 | Jones et al. | |
| 2011/0210173 A1 | 9/2011 | Adams et al. | |
| 2011/0284635 A1 | 11/2011 | Lapstun et al. | |
| 2014/0124578 A1 | 5/2014 | Adams et al. | |

OTHER PUBLICATIONS

Non-final Office Action for U.S. Appl. No. 12/714,055 mailed Jun. 13, 2013, 6 pages.

Notice of Allowance for U.S. Appl. No. 12/714,055 mailed Oct. 21, 2013, 10 pages.

Extended European Search Report for European patent application 13182629.9 mailed Nov. 29, 2013, 8 pages.

Fraser, "Exploiting Random Patterns of Optically Readable Materials to Ensure Authentication of Documents, Media & Substrates," Presented at the 2008 IEEE Conference on Technologies for Homeland Security, May 12-13, 2008, Waltham, Massachusetts, 6 pages.

Non-final Office Action for U.S. Appl. No. 14/156,005, mailed Nov. 9, 2015, 12 pages.

* cited by examiner

MECHANISMS FOR AUTHENTICATING THE VALIDITY OF AN ITEM

RELATED APPLICATIONS

This application claims the benefit of provisional patent application Ser. No. 61/695,920, filed Aug. 31, 2012, entitled COVERT TAGS FOR PRODUCT, PART AND COMPONENT AUTHENTICATION, and is a continuation-in-part of non-provisional patent application Ser. No. 12/714,055, filed Feb. 26, 2010, entitled STEGANOGRAPHY WITH PHOTO-RESPONSIVE DYES, the disclosures of each of which are hereby incorporated herein by reference in their entireties.

TECHNICAL FIELD

The embodiments relate generally to item authentication, and in particular to secure mechanisms for extracting authentication data from a label and using a remote authentication server for authentication purposes.

BACKGROUND

Counterfeiting of items is widespread and results in billions of dollars of losses annually. Item authentication often involves mechanisms that can be counterfeited relatively inexpensively, such as the copying of holographic tags, or requires specialized equipment that is costly and, consequently, not practical for authentication of relatively inexpensive items. Accordingly, there is a need for authentication mechanisms that can be implemented using relatively low cost techniques, but that are difficult or impossible to replicate.

SUMMARY

The embodiments relate to secure mechanisms for extracting authentication data from a label and using a remote authentication server for authentication purposes.

In one embodiment, a reader device records authentication data that is obscured in a label. The reader device provides the authentication data to a remote authentication server via a network. The reader device receives, from the remote authentication server, an authentication response based on the authentication data, and based at least in part on the authentication response, displays an indication that identifies whether the item is authentic.

In one embodiment, the reader device may emit photons in one or more predetermined bands toward the label and sense a photon-activated response of the authentication data in response to the emission of the photons in the first band. In other embodiments, the reader device may emit photons in a first band toward the authentication data to identify a first portion of the authentication data, and emit photons in a second band toward the authentication data to identify a second portion of the authentication data. In one embodiment, the reader device may receive, from the remote authentication server, emission instructions that include a first band identifier identifying the first band, and a second band identifier identifying the second band.

In one embodiment, the reader device may extract the authentication data from the label and send only the authentication data to the remote authentication server. In other embodiments, the reader device may generate an image of the label, and provide the image to the remote authentication server for decoding.

In one embodiment, the authentication data comprises a pattern embedded in the label and generated using one or more materials, such as dyes, nano-particles and nano-crystals with specific absorption and/or re-emission characteristics. The embedded pattern may be almost imperceptible to the unaided human eye, or may be completely invisible to the unaided human eye. The reader device includes a sensor that captures photonic emissions of the label, and generates an image. The reader device provides the image to the remote authentication server. The remote authentication server extracts the pattern from the image, and decodes the pattern to determine whether the item is authentic.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
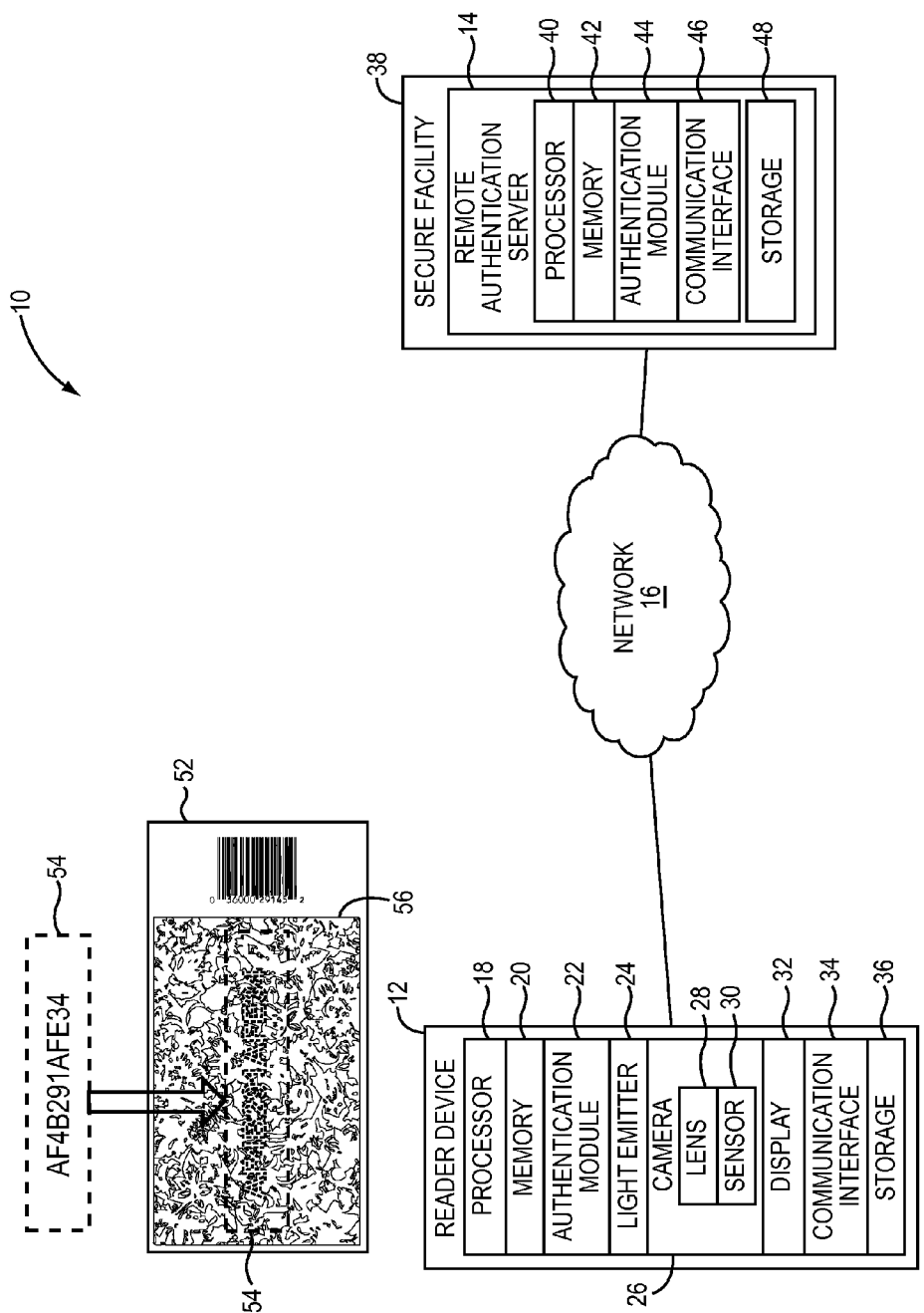
FIG. 1 is a block diagram of a system in which embodiments may be practiced.

FIG. 1 is a block diagram of a system 10 in which embodiments may be practiced. The system 10 includes a reader device 12 that is communicatively coupled to a remote authentication server 14 via a network 16. The reader device 12 includes a processor 18 and a memory 20. The memory 20 may contain one or more modules, such as an authentication module 22, that implement at least a portion of the functionality described herein. The reader device 12 may also include a light emitter 24 that may comprise one or more illumination devices configured to emit photons in one or more bands. The phrase "band" as used herein refers to one wavelength or a range of wavelengths. Thus, a band may comprise a single wavelength, or multiple consecutive wavelengths. The light emitter 24 may comprise, in one embodiment, a flash such as is commonly found on a smartphone, or the like. In other embodiments, the light emitter 24 may comprise a mechanism that is capable of emitting light in one or more selected bands, either concurrently or consecutively.

The reader device 12 also includes a camera 26, which comprises a lens 28 and a sensor 30. The sensor 30 may comprise a conventional complementary metal-oxide-semiconductor (CMOS) or charge-coupled device (CCD) sensor capable of detecting photons in the visible-to-near-infrared spectrum. In other embodiments, the sensor 30 may comprise a photodetector array capable of sensing photons in the nonvisible spectrum, such as the infrared or ultraviolet spectrums.

The reader device 12 may also include an integrated, or separate, display 32. A communication interface 34 is configured to communicate with the network 16, and may comprise, for example, a wired or wireless communication interface. A storage 36 may be used to store data. In one embodiment, the authentication module 22 comprises executable instructions that may be stored in the storage 36. Upon initiation, all or portions of the authentication module 22 may be loaded into the memory 20 and executed by the processor 18 to configure the processor 18 to carry out all or portions of the functionality described herein. For purposes of illustration, functionality implemented by any component of the reader device 12 may be attributed to the reader device 12 rather than the particular component of the reader device 12 that implements such functionality.

In one embodiment, the reader device 12 comprises a portable device with an image sensor, processor and network communication interface capable of connecting to the remote authentication server 14, including, for example, a laptop or desktop computer; a smartphone, such as an Apple® iPhone®, Android®-based smartphone; or the like.

The network 16 may comprise any suitable network or combination of networks capable of communicatively coupling the reader device 12 to the remote authentication server 14. In one embodiment, the network 16 includes a cellular network, such that the reader device 12 can communicate with the remote authentication server 14 even in the absence of a Wi-Fi™ or other local area network.

In one embodiment, the remote authentication server 14 may be located within a secure facility 38 that greatly restricts access to the remote authentication server 14. The remote authentication server 14 includes a processor 40 and a memory 42. The remote authentication server 14 may also include an authentication module 44, as described in greater detail herein. A communication interface 46 is configured to communicate with the network 16. A storage 48 stores data, such as authentication and/or encryption data, for use in authenticating an item, as discussed in greater detail herein.

In one embodiment, a label 52 includes embedded authentication data 54. The label 52 is associated with an item (not illustrated). The item may comprise anything that an entity wants to authenticate, such as a consumer good, money, tickets, and the like. The authentication data 54 may be partially or completely obscured. In some embodiments, the authentication data 54 may be invisible to the unaided human eye. The authentication data 54 may be embedded in non-authentication data 56, which may comprise, for example, an image, text, or the like. In some embodiments, the authentication data 54 may be printed or otherwise generated using a material with particular absorption centers in the visible spectrum, such as one or more dyes, nanoparticles, nano-crystals, or phosphors with particular absorption and/or re-emission levels in the red/green/blue visible spectrum bands.

In some embodiments, the material may emit or reflect photons that have a particular polarization state. Such polarized photons may not be discernible to the unaided human eye, but can be discerned with a sensor 30 that has a polarized lens or filter positioned in front of the sensor 30, as discussed in greater detail herein.

While for purposes of illustration, the label 52 illustrated in FIG. 1 is shown as being separate from the item being authenticated, in other embodiments, the label 52 may be integral with the item being authenticated.

In some embodiments, the material may be photo-responsive in the sense that the material has one or more excitation and emission bands. In other embodiments, the material may have or be equipped with absorptive or reflective properties without requiring or otherwise having emissive properties. Such materials may include polarizing inks such as inks that are only visible using a polarizing filter. Such materials may also include absorptive and/or re-emissive materials that may not generate effects visible to or discernible by an unaided human eye. In some embodiments, the material used to generate the authentication data 54 may include absorptive and/or re-emissive materials that generate effects in the visible spectrum that can be discerned by a photo-detection device, such as the sensor 30, but cannot readily be discerned by an unaided human eye. In other embodiments, the authentication data 54 may be generated with absorptive and/or re-emissive materials that generate effects outside the visible spectrum, such as in the infrared spectrum and/or in the ultraviolet spectrum.

In some embodiments, the material may cause or otherwise exhibit color shifting behavior when illuminated (such as, for example, illumination with white light). In some embodiments, such effects may be combined with polarization effects.

In some embodiments, the material may include oxide-based inks, dyes, ink additives, dye additives and/or coatings. In some embodiments, coatings may be used, such as oxide-based coatings that are resistant to abrasions, scratches, scuffing, and the like. In some embodiments, the materials are configured to work at specific wavelengths. For example, if the light emitter 24 is a wideband light emitter, such as white light, the material may be configured to absorb one or more portions of the visible spectrum, effectively removing the portion of the spectrum from the image. Removing portions of the spectrum alters the color perceived by the sensor 30. Thus, the image generated by the sensor 30 will appear to have shifted color. In some embodiments, such a color shift can be used to form the authentication data 54.

In some embodiments, the authentication data 54 may be embedded into the non-authentication data 56. The non-authentication data 56 may be printed using an ink that is readily discernible in the visible spectrum. The authentication data 54 may then be printed over the non-authentication data 56 using, for example, a material such as a nano-particle or nano-crystal coating or a nano-particle or nano-crystal bearing ink. The material may have specific absorptive properties that differ in some degree from that of the ink used to generate the non-authentication data 56. In one embodiment, the authentication data 54 may comprise a pattern of very slightly different colors that can be discerned by the sensor 30, but are not discernible to the unaided human eye.

In some embodiments, the authentication data 54 may be made up of multiple different materials with different absorptive or emissive properties to generate any desired color pattern. In some embodiments, such color patterns may include or be combined with polarization patterns.

In some embodiments, the authentication data 54 may be printed or otherwise generated using a material that includes a time-decay factor. For example, pharmaceutical items, perishables, and time-sensitive documents or packages, may be provided with authentication data 54 comprising a material having a predetermined time-decay factor. The time-decay factor may result in a progressive change or degradation of the material due to prolonged exposure to factors such as UV radiation or oxygen. The reader device 12 or remote authentication server 14 may determine an age of the item based on a degree of degradation of the material.

Figure 2:
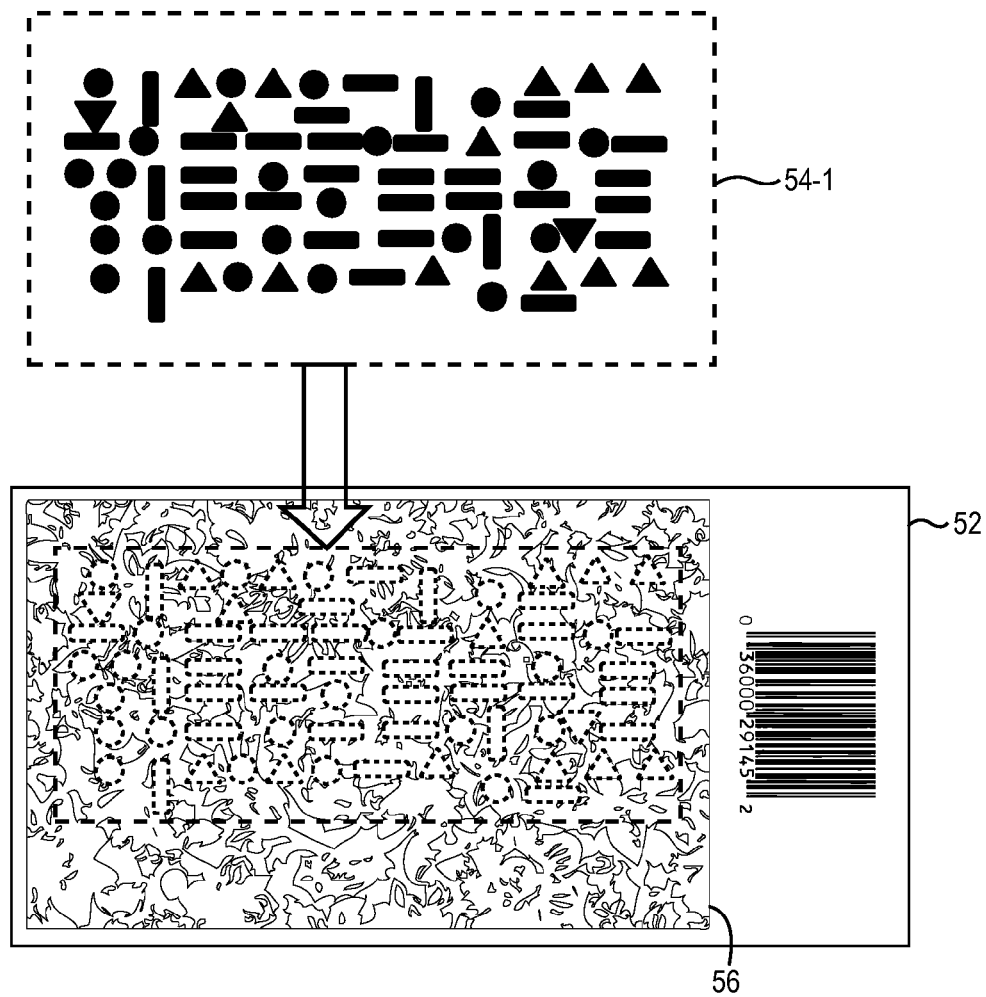
FIG. 2 is a diagram illustrating authentication data according to another embodiment.

FIG. 2 is a diagram illustrating authentication data 54-1 according to another embodiment. In this embodiment, the authentication data 54-1 comprises a particular pattern that is embedded in the underlying non-authentication data 56. While for purposes of illustration, the pattern is illustrated as comprising different geometric shapes, the patterns are not limited to geometric shapes. In some embodiments, the authentication data may comprise a color pattern generated based on the particular materials, such as dyes, nano-particle, nano-crystals, and the like, which are imprinted on the non-authentication data 56 to form the desired color pattern. Such color pattern may be obscured, or completely invisible, to the unaided human eye, but capable of being resolved by the sensor 30. In some embodiments, the sensor 30 generates an image of the data collected by the sensor 30, and the reader device 12 provides the image to the remote authentication server 14.

The remote authentication server 14 utilizes digital processing to extract the pattern from the image, decodes the pattern in accordance with a particular algorithm or function, and then determines whether the decoded pattern is authentic. The remote authentication server 14 may then provide an authentication response to the reader device 12 indicating whether the authentication data 54-1 is authentic or is inauthentic. In some embodiments, the remote authentication server 14 may search for a particular pattern in the image based on additional information contained in the image, or provided to the remote authentication server 14, such as an item identifier that identifies the item with which the label is associated.

Figure 3:
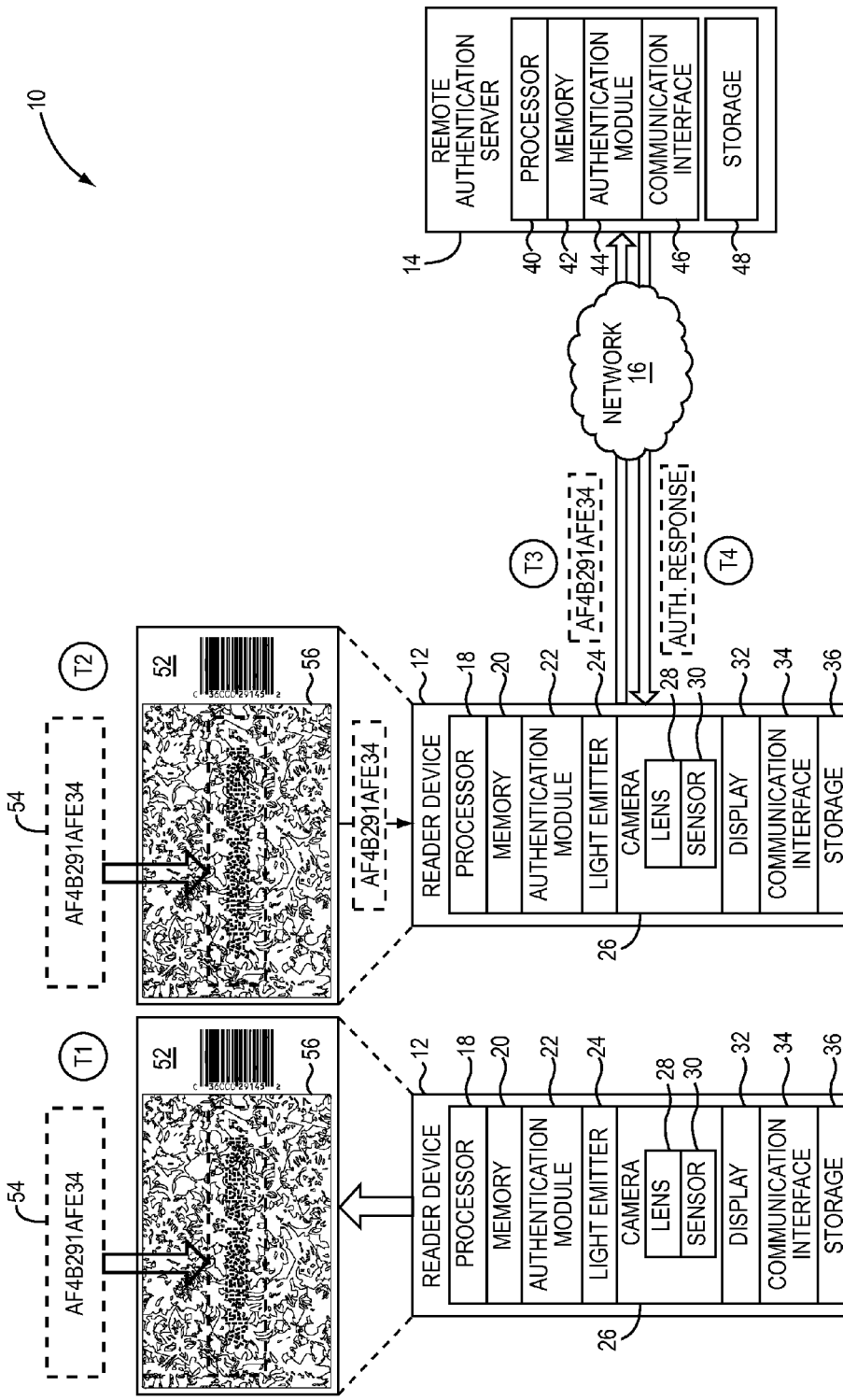
FIG. 3 is a block diagram of the system illustrated in FIG. 1 at different points in time according to one embodiment.
Figure 4:
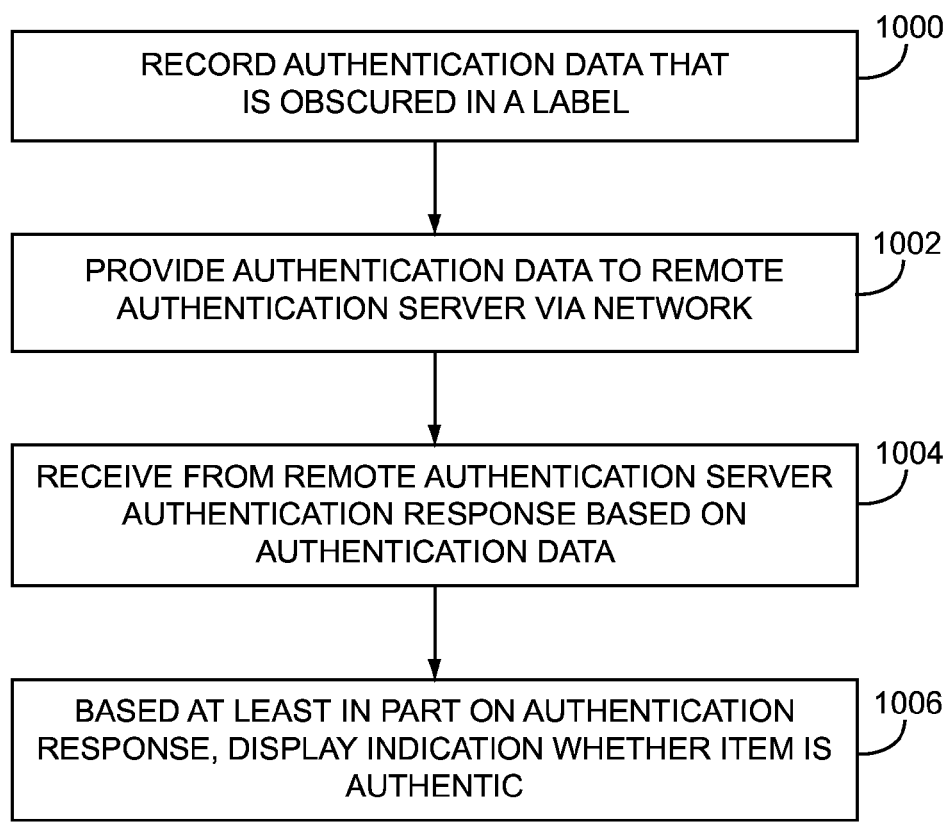
FIG. 4 is a flowchart of a method for authenticating an item according to one embodiment.

FIG. 3 is a block diagram of the system 10 illustrated in FIG. 1 at different points in time according to one embodiment. FIG. 4 is a flowchart of a method for authenticating an item according to one embodiment, and will be discussed in conjunction with FIG. 3. At times T1 and T2, the reader device 12 records the authentication data 54 that is obscured in the label 52 (FIG. 4, block 1000). In one embodiment, the reader device 12 records the authentication data 54 by, at time T1, emitting photons toward the authentication data 54. The photons emitted may be white light, such as created by a flash, or may comprise light of a particular band. In response, at time T2, the materials used to print or otherwise generate the authentication data 54 undergo a photon-activated response in response to the receipt of the photons emitted by the reader device 12. The sensor 30 senses the photon-activated response, which may comprise, for example, the emission of photons in a particular band. The sensor 30 generates an image in which the authentication data 54 is recorded based on the photons collected by the sensor 30.

In one embodiment, the authentication module 22 may also extract the authentication data 54 from the image. At a time T3, the reader device 12 may then provide the authentication data 54 to the remote authentication server 14 via the network 16 (FIG. 4, block 1002). In one embodiment, the remote authentication server 14 may then perform an authentication function on the authentication data 54 to determine if the authentication data 54 is authentic. The authentication function may comprise any desirable function suitable for determining whether the authentication data 54 is authentic or not. At a time T4, the remote authentication server 14 may then provide an authentication response that indicates whether or not the authentication data 54 is authentic based on the results of the authentication function. In other embodiments, the remote authentication server may, based on the authentication data 54, determine a corresponding authentication value and provide a corresponding authentication value in an authentication response to the reader device 12.

The reader device 12 receives the authentication response from the remote authentication server 14 (FIG. 4, block 1004). If the authentication response comprises an indication as to whether the authentication data 54 is authentic, the reader device 12 may display the indication on the display 32 (FIG. 4, block 1006). If the authentication response comprises a corresponding authentication value, then the reader device 12 may perform an authentication function that is based on both the authentication data 54 and the corresponding authentication value to determine an authentication result. The authentication result may be used to determine whether the authentication data 54 is authentic or not. The reader device 12 may then display an indication on the display 32 as to whether the associated item is authentic.

Figure 5:
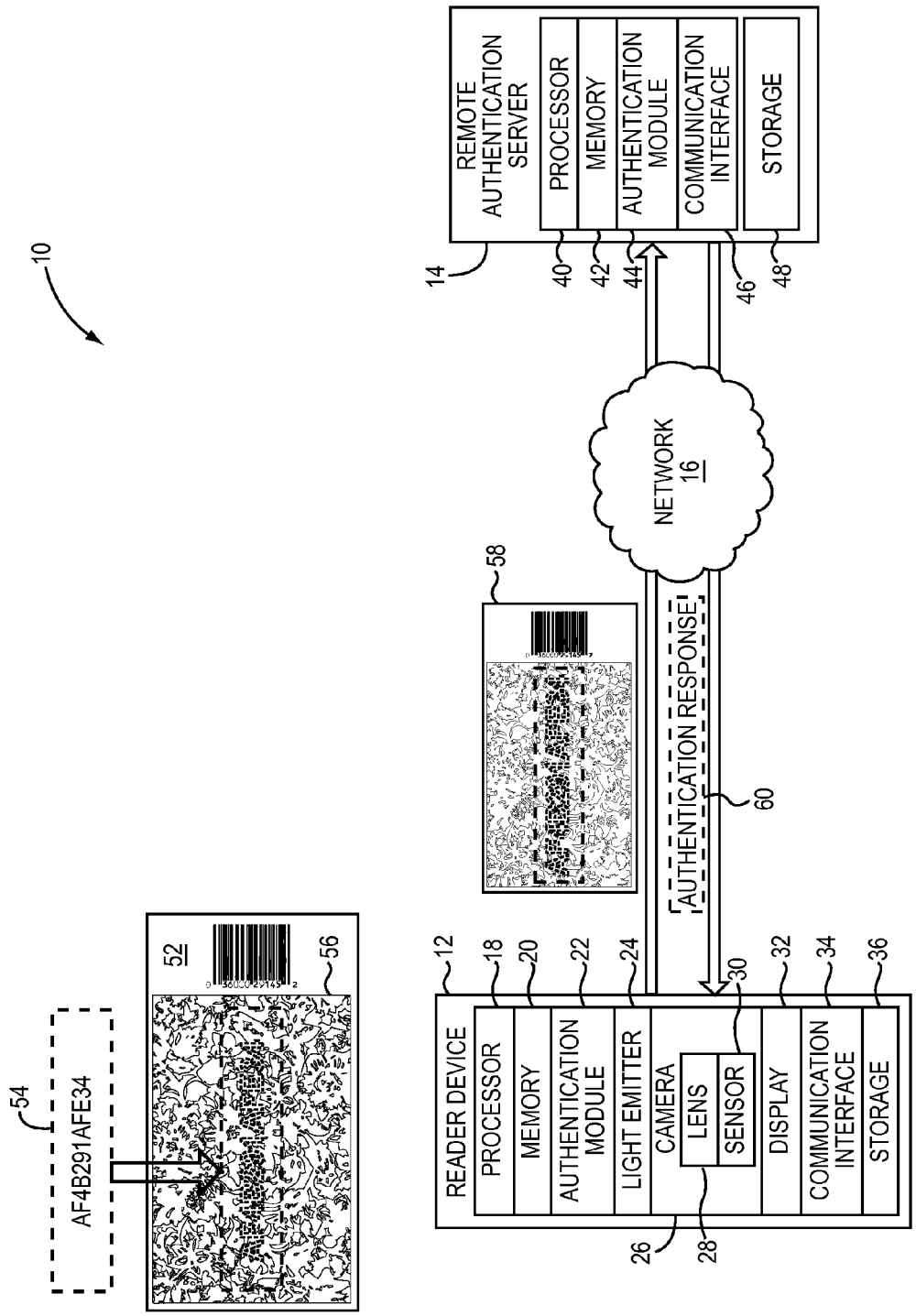
FIG. 5 is a block diagram of the system illustrated in FIG. 1 in which additional embodiments may be practiced.

FIG. 5 is a block diagram of the system 10 in which additional embodiments may be practiced. In such embodiments, the reader device 12, using the camera 26, records the authentication data 54 by generating an image 58 of the label 52. As discussed above, the authentication data 54 is printed, or otherwise generated, from materials, as discussed above, that may absorb or emit photons in particular bands such that the authentication data 54 is obscured, or completely invisible to an unaided human eye, but that is resolvable via digital imaging. The reader device 12 then provides the image 58 to the remote authentication server 14. The remote authentication server 14 extracts the authentication data 54 from the image 58 using any desired digital imaging technique or process. The authentication data 54 may comprise, as discussed above, a color pattern formed by the emission and/or absorption of photons at desired wavelengths. The remote authentication server 14 may decode the pattern in accordance with a particular decoding function. The remote authentication server 14 may then determine whether the decoded pattern is authentic or not, and provide an authentication response 60 to the reader device 12 that is based on the determination. In this embodiment, the reader device 12 need not have any knowledge or information about the authentication data 54, how it is embedded in the label 52, or the decoding function used by the remote authentication server 14, resulting in a very reliable authentication mechanism that is difficult to reverse engineer or otherwise compromise.

Figure 6:
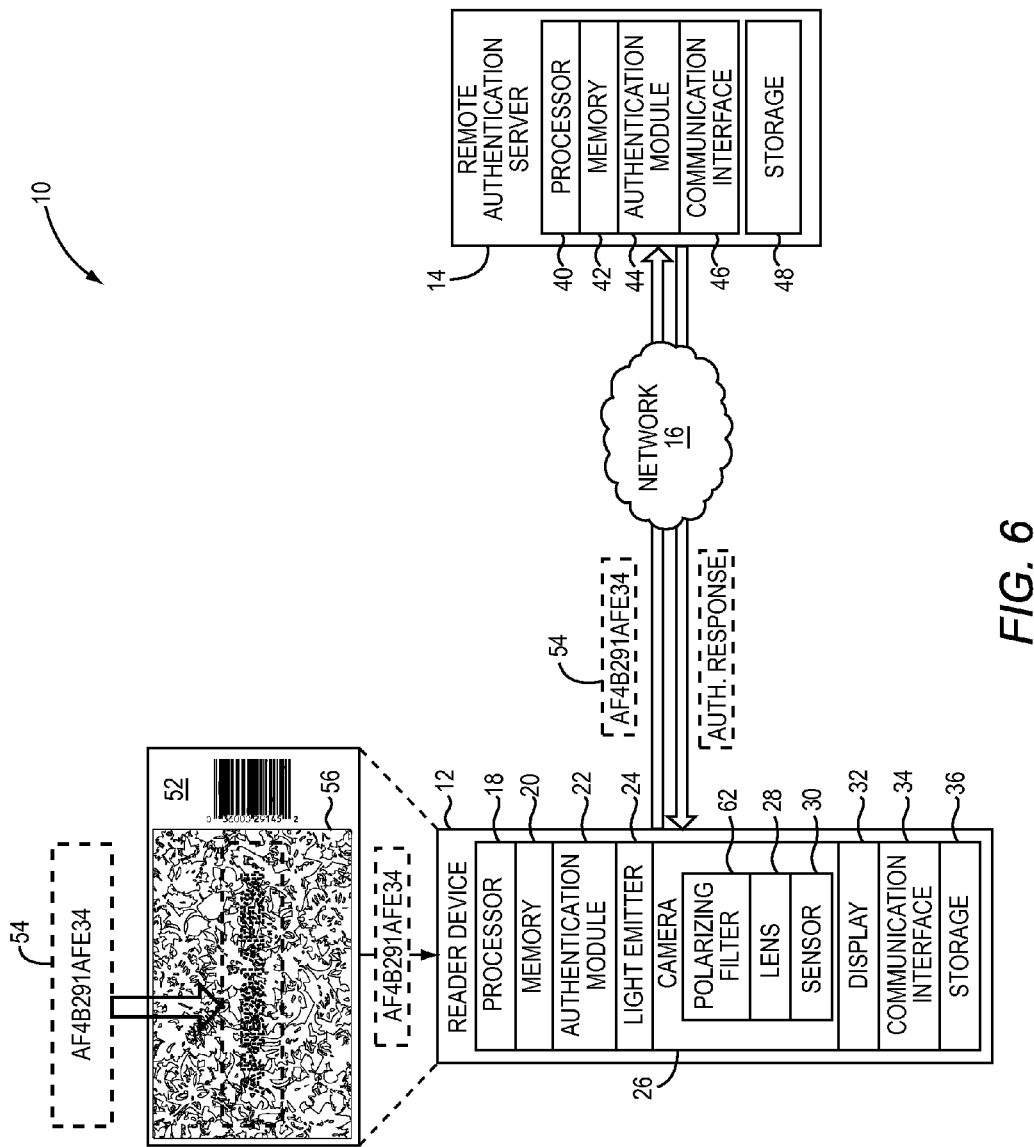
FIG. 6 is a block diagram of the system illustrated in FIG. 1 in which additional embodiments may be practiced.

FIG. 6 is a block diagram of the system 10 in which additional embodiments may be practiced. In these embodiments, the reader device 12 includes a polarizing lens or filter 62. The polarizing filter 62 may be integral with the camera 26, or may comprise a separate attachment which, when properly coupled to the reader device 12, fits over the lens 28 and the light emitter 24. The authentication data 54 may be printed, or otherwise generated, with a material that alters the polarization of light that passes through the material, such as a liquid crystal material. In operation, the reader device 12 initiates the light emitter 24. The light emitter 24, such as a camera flash, emits light (i.e., photons), which is polarized in a particular polarization state due to the polarizing filter 62. Assume that the authentication data 54 is printed, or otherwise generated, with a liquid crystal material that causes a ¼ wave retardation in the polarization state of the photons. The polarized photons pass through the authentication data 54, strike the substrate of the label 52, and reflect back through the authentication data 54, resulting in the photons having a polarization state that is ½ wave (i.e., 90 degrees) different from the photons emitted by the light emitter 24 due to the passage of such photons through the authentication data 54 twice.

Because the polarizing filter 62 has a different polarization than the photons that have passed through the authentication data 54, such photons are blocked by the polarizing filter 62 and not received by the sensor 30, resulting in an image with omitted energy in the pattern of the authentication data 54, and thus detectable. The reader device 12 may then extract the authentication data 54 from the image, and provide the authentication data 54 to the remote authentication server 14 (as illustrated in FIG. 6), or, in other embodiments, the reader device 12 may provide the image itself to the remote authentication server 14 for processing, as discussed above. While for purposes of illustration certain polarization states have been presented herein, the embodiments are not limited to any particular polarization state. For example, in some materials a circular polarization state may provide better contrast and thus enhanced detection by the sensor 30 than a linear polarization state.

In such embodiments, the authentication data 54 may be imprinted on the label 52 at the time the label 52 is initially generated, or, in alternative embodiments, the authentication data 54 may be imprinted on the label 52 at a subsequent point in time. For example, assume that the label 52 comprises an amusement park ticket that includes non-authentication data 56, as well as a coating of a material, such as a liquid crystal material, that is invisible to the unaided human eye, but which may be subsequently altered by, for example, ultraviolet (UV) light. An individual purchases the amusement park ticket at a ticket booth and a fingerprint of the individual is obtained. The fingerprint of the individual is then burned, such as by UV light, into the liquid crystal material coated on the amusement park ticket. The fingerprint of the individual may also be provided to the remote authentication server 14.

In use, the individual may subsequently provide the amusement park ticket to an attendant at the gate of the amusement park. The attendant may then, using the reader device 12 that contains a polarizing filter 62, as discussed above, record an image of the amusement park ticket. As discussed above, during the recording process, the reader device 12 may initiate the light emitter 24. The polarizing filter 62 causes only photons oriented in a particular direction to be emitted, as well as captured by the sensor 30. Thus, photons that pass through the fingerprint of the individual recorded in the liquid crystal material are not received by the sensor 30, altering the image generated by the sensor 30. The reader device 12 may send the image to the remote authentication server 14, which may then identify the fingerprint from the image, and authenticate the fingerprint against the known fingerprint of the individual provided when the amusement park ticket was purchased.

Figure 7:
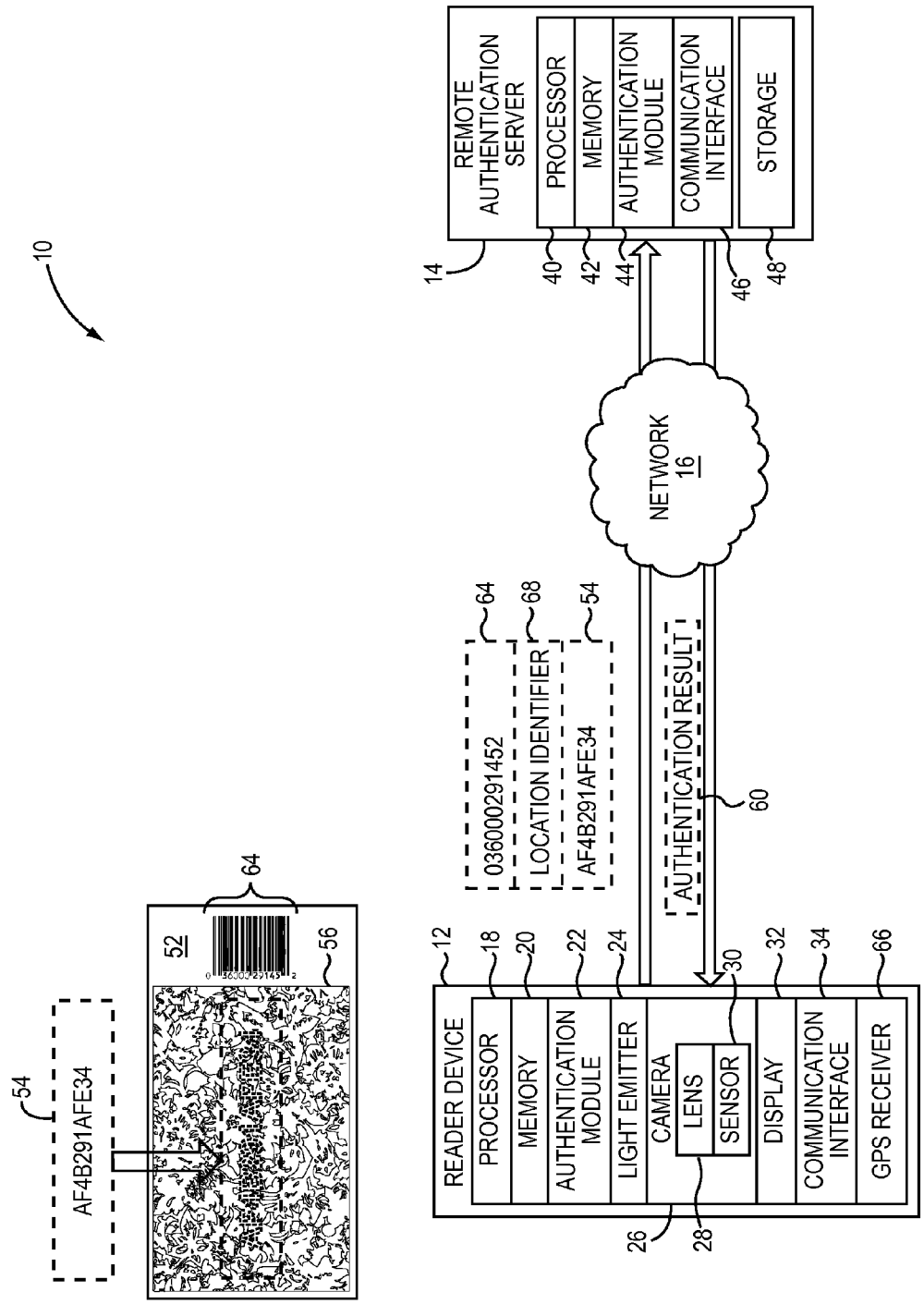
FIG. 7 is a block diagram of the system illustrated in FIG. 1 in which additional embodiments may be practiced.

FIG. 7 is a block diagram of the system 10 in which additional embodiments may be practiced. In these embodiments, the label 52 may include an item identifier 64 that identifies the item with which the label 52 is associated. The reader device 12 may also include a global positioning system (GPS) receiver 66 that enables the reader device 12 to determine the location of the reader device 12 when in operation. In one embodiment, the reader device 12, using the camera 26, generates an image of the label 52, and determines the location of the reader device 12.

The reader device 12 may extract the item identifier 64 and the authentication data 54 from the image. The reader device 12 provides to the remote authentication server 14 the item identifier 64, the authentication data 54, and a location identifier 68 that identifies a location of the reader device 12.

The remote authentication server 14 may use the item identifier 64 to select a particular authentication function of a plurality of different authentication functions to determine whether the authentication data 54 is authentic or not. Thus, each different item may utilize a different authentication function. The remote authentication server 14 may also use the location identifier 68 to determine whether the authentication data 54 is authentic or not. For example, even if the remote authentication server 14 determines, based on the selected authentication function, that the authentication data 54 is authentic, such authentication data 54 may be authentic only when sold in a particular country. If such authentication data 54 is being used in conjunction with items in a different country, this may indicate black marketing, or other illegal sales of goods, and thus, the remote authentication server 14 may provide an authentication response that indicates that the authentication data 54 is not authentic.

In other embodiments, the reader device 12 may send the image generated by the sensor 30 to the remote authentication server 14. The remote authentication server 14 may extract the item identifier 64 and the authentication data 54 from the image, and process such authentication data 54, in conjunction with the location identifier 68, as discussed above.

Figure 8:
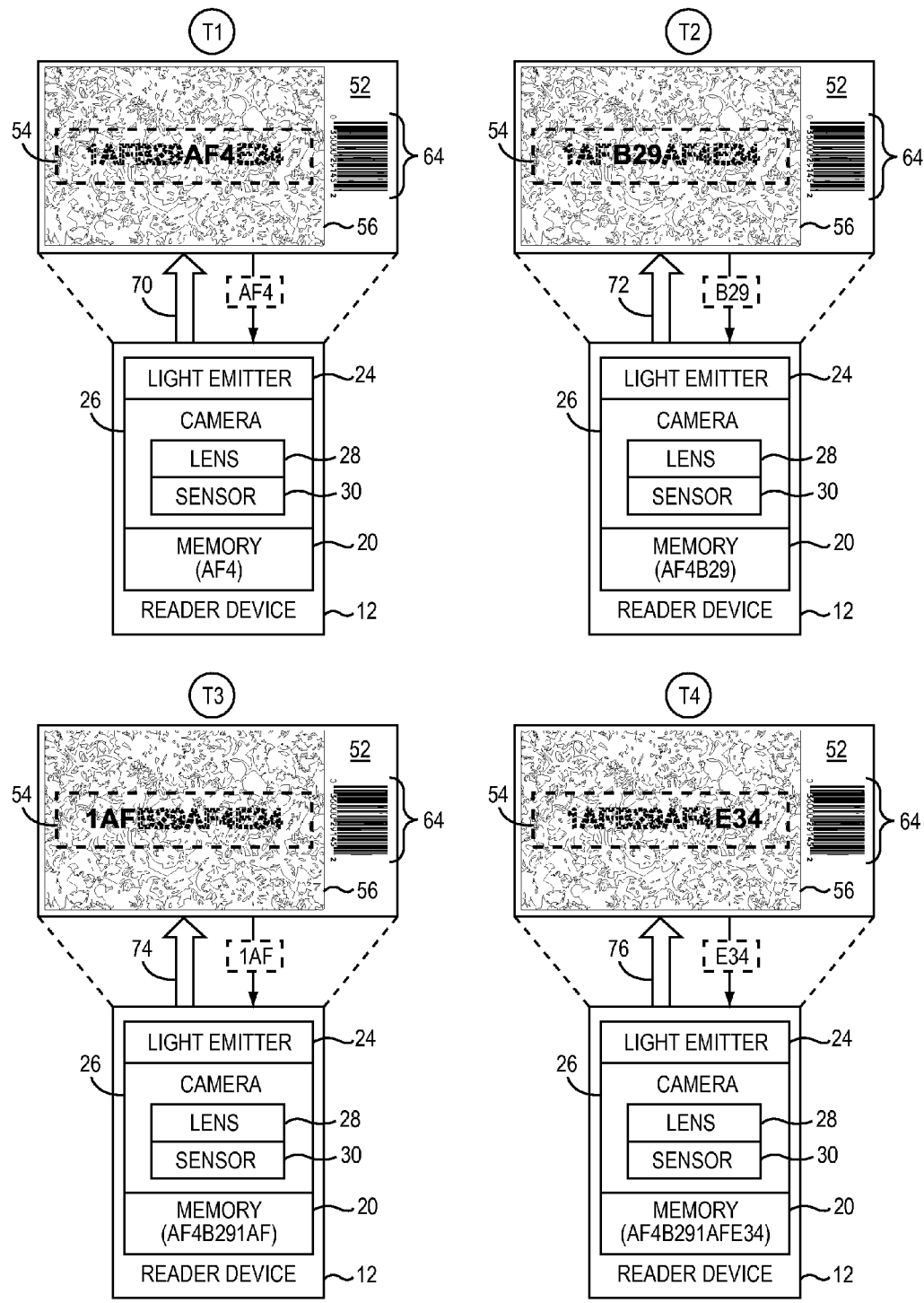
FIG. 8 is a block diagram of the system illustrated in FIG. 1 in which additional embodiments may be practiced.

FIG. 8 is a block diagram of the system 10 in which additional embodiments may be practiced. For purposes of illustration, FIG. 8 omits certain elements and components of the reader device 12 and the remote authentication server 14 that may be utilized in the described embodiments. In one embodiment, the reader device 12 may emit photons in different bands to induce a response in different portions of the authentication data 54, in order to assemble the authentication data 54 in an order, or pattern, that differs from the order, or pattern, in which the authentication data 54 is actually embedded in the label 52. In particular, assume that at a time T1 the reader device 12 emits photons 70 in a first band toward the label 52. A first portion ("AF4") of the authentication data 54 is configured to emit photons in a first emission band in response to the photons 70 in the first band, and the sensor 30 records the first portion ("AF4") of the authentication data 54. The reader device 12 extracts the first portion ("AF4") of the authentication data 54 and stores it in the memory 20.

At a time T2, the reader device 12 emits photons 72 in a second band toward the label 52. A second portion ("B29") of the authentication data 54 is configured to emit photons in a second emission band in response to the photons 72 in the second band, and the sensor 30 records the second portion ("B29") of the authentication data 54. The reader device 12 extracts the second portion ("B29") of the authentication data 54 and appends it to the data stored in the memory 20.

At a time T3, the reader device 12 emits photons 74 in a third band toward the label 52. A third portion ("1AF") of the authentication data 54 is configured to emit photons in a third emission band in response to the photons 74 in the third band, and the sensor 30 records the third portion ("1AF") of the authentication data 54. The reader device 12 extracts the third portion ("1AF") of the authentication data 54 and appends it to the data stored in the memory 20.

At a time T4, the reader device 12 emits photons 76 in a fourth band toward the label 52. A fourth portion ("E34") of the authentication data 54 is configured to emit photons in a fourth emission band in response to the photons 76 in the fourth band, and the sensor 30 records the fourth portion ("E34") of the authentication data 54. The reader device 12 extracts the fourth portion ("E34") of the authentication data 54 and appends it to the data stored in the memory 20. The reader device 12 may then provide the authentication data 54 assembled in the memory 20 to the remote authentication server 14 for processing as discussed above.

The times T1-T4 may occur concurrently or immediately in succession in a total elapsed time limited only by the cycle time of the sensor 30, and thus may complete in less than one second, in some embodiments.

In one embodiment, the reader device 12 may first extract the item identifier 64 from the label 52, and provide the item identifier 64 to the remote authentication server 14. The reader device 12 may then receive emission instructions from the remote authentication server 14 that include a first band identifier identifying the first band, a second band identifier identifying the second band, a third band identifier identifying the third band, and a fourth band identifier identifying the fourth band. Thus, in some embodiments, the authentication data 54 provided to the remote authentication server 14 is dependent on the emission instructions received from the remote authentication server 14, decreasing a likelihood of the reverse engineering of the authentication data 54.

While the embodiments have been disclosed herein in the context of authentication data 54 that is obscured in a label 52 such that the authentication data 54 is not perceivable by the unaided human eye, the embodiments are not limited to such obscured authentication data 54. In other embodiments, authentication data 54 may be visible to the unaided human eye, but may not be discernible as a particular code that contains authentication data 54. For example, the authentication data 54 may be in the form of a visible pattern made up of various lines, arcs, shapes, or the like which, when provided to the remote authentication server 14, can be matched against other such patterns to be used for authentication purposes. In other embodiments, the authentication data 54 may be in the form of a predetermined pattern of discontinuities on the label 52, such as bumps, grooves, or the like that, while visible to the unaided human eye, may not be discernible as a code.

Moreover, while for purposes of illustration the reader device 12 has been described herein as containing a single sensor 30, in some embodiments the reader device 12 may contain multiple sensors 30, and be capable of recording multiple images of the same label 52 from slightly different perspectives, which may facilitate the extraction of authentication data 54 from the label 52 depending on the manner in which the authentication data 54 is printed on the label 52.

Those skilled in the art will recognize improvements and modifications to the preferred embodiments of the present disclosure. All such improvements and modifications are considered within the scope of the concepts disclosed herein and the claims that follow.

What is claimed is:

1. A method for validating the authenticity of an item, comprising:
   emitting, by a reader device comprising a programmed processor, photons having a first polarization state toward authentication data that is obscured in a label; and
   blocking, by the reader device, photons having a polarization state that differ from the first polarization state from being recorded to obtain the authentication data that is obscured in the label;
   recording, by the reader device, the authentication data;
   providing, by the reader device, the authentication data to a remote authentication server via a network;
   receiving, from the remote authentication server, an authentication response based on the authentication data; and
   based at least in part on the authentication response, displaying, by the reader device, an indication that identifies whether the item is authentic.

2. The method of claim 1, wherein recording the authentication data comprises generating an image of the label, and wherein providing the authentication data to the remote authentication server comprises providing the image to the remote authentication server.

3. The method of claim 1, wherein recording the authentication data comprises generating an image of the label, and further comprising extracting, by the reader device, the authentication data from the label.

4. The method of claim 1, wherein the authentication response comprises corresponding authentication data, and further comprising:
   determining, by the reader device, based on the authentication data and the corresponding authentication data, an authentication result; and
   based on the authentication result, displaying the indication that identifies whether the item is authentic.

5. The method of claim 1, wherein the authentication data that is obscured in the label is invisible to the unaided human eye.

6. The method of claim 1, wherein the reader device comprises a smartphone.

7. The method of claim 1, wherein the label is integral with the item.

8. A method for validating the authenticity of an item, comprising:
   recording, by a reader device comprising a programmed processor, authentication data that is contained in a label, the label comprising a first code portion and a second code portion, by:
   emitting photons in a first band toward the label;
   receiving photons in a first emission band from the label that identify the first code portion of the authentication data;
   emitting photons in a second band toward the label;
   receiving photons in a second emission band from the label that identify the second code portion of the authentication data; and
   assembling the first code portion with the second code portion in an order that is different from an order in which the first code portion and the second code portion are contained in the label to generate the authentication data;
   providing, by the reader device, the authentication data to a remote authentication server via a network;

receiving, from the remote authentication server, an authentication response based on the authentication data; and based at least in part on the authentication response, displaying, by the reader device, an indication that identifies whether the item is authentic.

9. The method of claim 8, wherein the authentication data is obscured such that the authentication data is invisible to an unaided human eye.

* * * * *